J. T. SHELDON.
Feather-Renovator.

No. 214,847. Patented April 29, 1879.

UNITED STATES PATENT OFFICE.

JAMES T. SHELDON, OF SPRINGFIELD, MASSACHUSETTS.

IMPROVEMENT IN FEATHER-RENOVATORS.

Specification forming part of Letters Patent No. 214,847, dated April 29, 1879; application filed December 24, 1878.

*To all whom it may concern:*

Be it known that I, JAMES T. SHELDON, of Springfield, county of Hampden, and State of Massachusetts, have invented new and useful Improvements in Feather-Renovators, which improvements are fully set forth in the annexed specification, and in the accompanying drawings.

My invention relates to that class of feather-renovators in which steam is used as a cleansing agent, introduced into a drum containing the feathers, and is in the nature of an improvement upon the machine patented by me February 7, 1871; and consists of an improved construction of the steam heating, drying, and induction pipes arranged within the said drum or cylinder.

Figure 1:
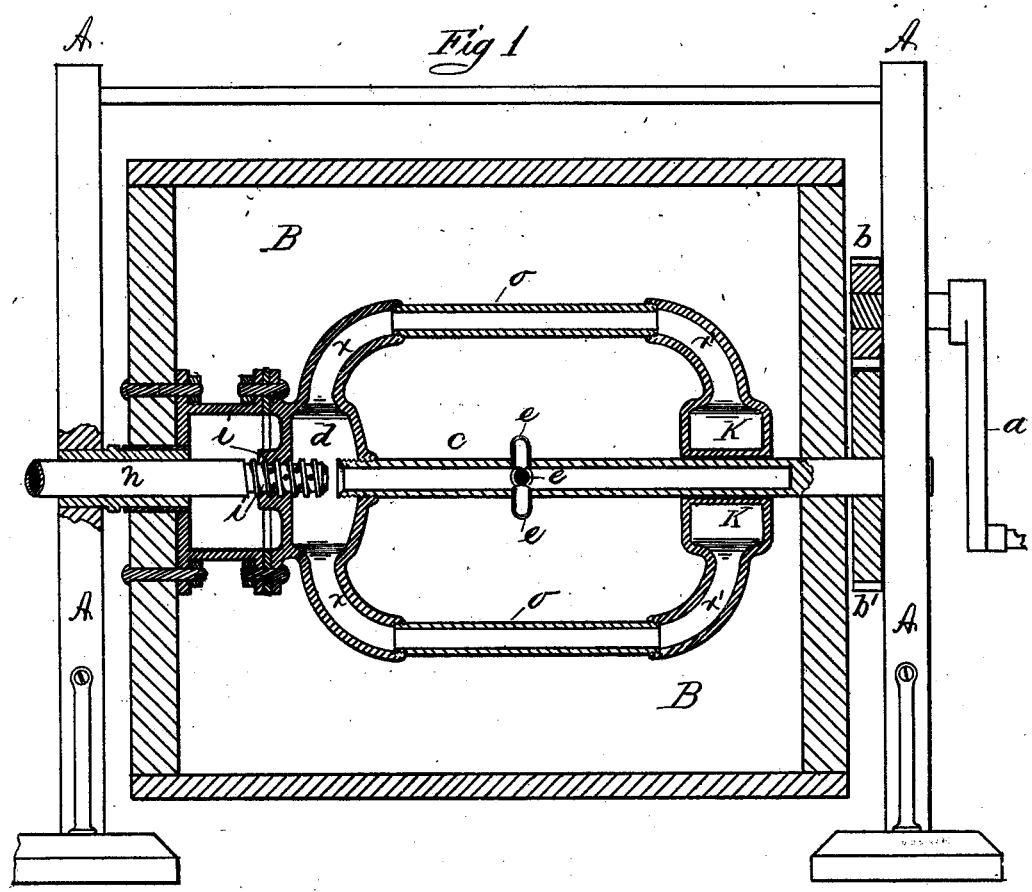
Figure 2:
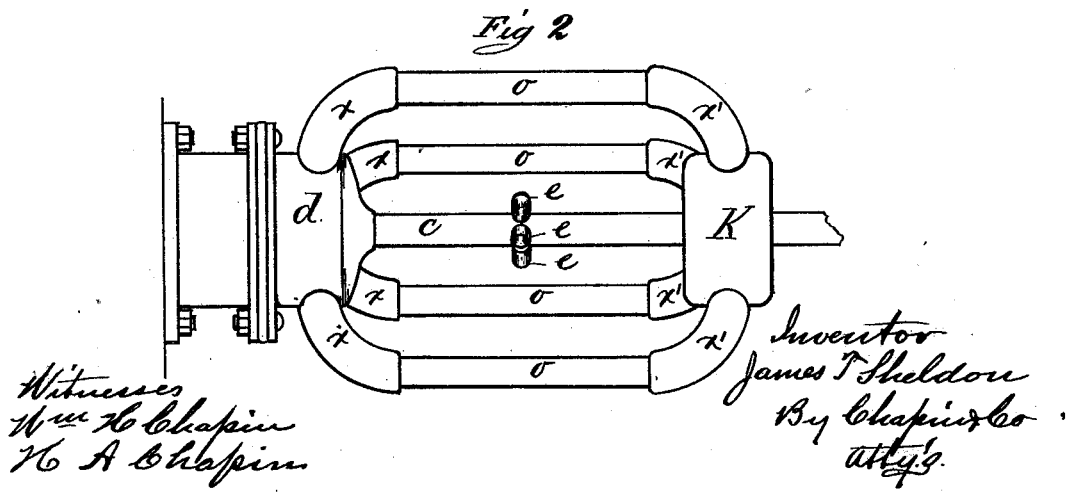

In the drawings, which consist of two figures, Figure 1 is a longitudinal section of my improved machine. Fig. 2 is a side elevation of the steam heating and drying pipes and their connections removed from the drum.

A are standards in which the feather-drum is supported. $b$ $b'$ are gears. $a$ is a crank. B is the drum. $c$ is the center shaft and induction-pipe combined. $e$ are steam-jet pipes. $d$ is a steam-chamber. $i$ is a tubular valve. $i'$ is a valve-screw nut. $n$ is a hollow arbor. $o$ are a series of steam-pipes. $k$ is a second steam-chamber.

In feather-renovators constructed with a heating and drying cylinder such as is shown in my above-named patent, I have found that the action of the steam upon the mass of feathers in the drum was not all that could be desired; and I have discovered that by causing the more perfect dissemination of the steam-heat by a series of pipes through the feathers, in conjunction with jets of steam injected among them, I have produced much improved results.

The drum B is made of convenient size to receive the steam drying and heating devices, and is hung so it can be revolved between the vertical standards A A, tubular shaft $c$ being its axis at one end and hollow arbor $n$ its axis at the other end, the latter being secured to a flange covering the end of chamber $d$. The latter is bolted to the inner side of one of the heads of drum B, centrally opposite hollow arbor $n$, and is constructed with branches $x$ projecting from the body thereof, to which pipes $o$ are connected. Tubular shaft $c$ is firmly attached to the center of drum or chamber $d$, and its end, projecting slightly within the latter, is so shaped as to constitute a seat for the conically-shaped end of valve $i$, said valve, together with a nozzle connected to a steam-conducting hose, which is arranged to fit inside of the valve-tube, being constructed and arranged to operate substantially as described in my said Letters Patent of 1871.

The second steam-chamber, $k$, is constructed with branches $x'$ projecting from the body thereof, and arranged to be connected, as shown, to one end of pipes $o$, the latter forming the steam-connection between chambers $d$ and $k$. Chamber $k$ is constructed with a tubular passage through its center for the tubular shaft $c$, and said passage is of such diameter that the tubular shaft $c$ freely slips through it.

On the tubular shaft $c$ are inserted jet-pipes $e$, communicating with its interior, having cut slots in the convex ends thereof, similar to a bat-wing gas-burner, or having other-shaped apertures which will direct currents of escaping steam toward both sides and ends of drum B.

The operation of my machine is as follows, viz: I arrange a steam-connection, as above mentioned, with a boiler so constructed as to supply dry or high-pressure steam, which is admitted into the machine through tubular valve $i$. The feathers or other material to be operated upon are inclosed in drum B, and steam is at first admitted only into chamber $d$, and through pipes $o$ into chamber $k$, for the purpose of suitably heating the mass of feathers, valve $i$ discharging steam into chamber $d$ through holes drilled in it through its screwed portion, as shown. Subsequently valve $i$ is withdrawn from the end of the tubular shaft $c$, permitting steam from chamber $d$ to flow into it and out through jet-pipes $e$ into and among the feathers. When they have been suitably so steamed, valve $i$ is closed and the steam-jets shut off, and the heat from pipes $o$ and chambers $d$ and $k$, surrounded by the feathers, dry all moisture out of them. Drum B, during the before-mentioned steaming process, is revolved by turning crank $a$ and gears $b$ $b'$, the latter being secured on tubular shaft $c$. Drum B is constructed with ventilating-plates on the sides thereof, substantially as and for the purpose described in my patent of 1871.

It is obvious that my improved machine as herein described and shown operates much more effectively to thoroughly cleanse and renovate the feathers, owing to the construction of the steam chambers and pipes within drum B, and their arrangement which allows them to convey among the feathers the requisite heat, while in my machine as shown in my said patent of 1871 the feathers were only partially brought in contact with the smooth surface of a central steam-drum. In my improved machine as herein shown the feathers are being continually agitated and heated at the same time, and thus the entire mass of them must be acted upon and cleansed and renovated.

The usual openings are arranged in drum B for introducing and removing the feathers therefrom.

I provide for drawing off any condensed steam that may accumulate in chambers $d$ and $k$ by an ordinary vent-cock applied to them; and, if necessary, I draw from tubular shaft $c$ such condensed steam by drilling through its end on which gear $b'$ is fixed and inserting a vent-cock in the outer end thereof.

What I claim as my invention is—

The combination, with tubular valve $i$, of steam-chambers $d$ and $k$, connected together by pipes $o$, and the tubular shaft $c$, provided with jet-pipes $e$, substantially as and for the purpose set forth.

J. T. SHELDON.

In presence of—
H. A. CHAPIN,
WM. H. CHAPIN.